United States Patent [19]

Fuji et al.

[11] Patent Number: 5,365,507
[45] Date of Patent: Nov. 15, 1994

[54] LIGHT-AMOUNT CONTROL DEVICE FOR AN OPTICAL-DISK RECORDING-REPRODUCTION APPARATUS

[75] Inventors: Hiroshi Fuji; Takashi Iwaki, both of Nara, Japan

[73] Assignee: Sharp Kabushiki Kaisha, Osaka, Japan

[21] Appl. No.: 100,663

[22] Filed: Jul. 30, 1993

[30] Foreign Application Priority Data

Aug. 10, 1992 [JP] Japan .................................. 4-212572

[51] Int. Cl.$^5$ .............................................. G11B 7/00
[52] U.S. Cl. ...................................... 369/116; 369/54
[58] Field of Search ................. 369/116, 13, 54, 58

[56] References Cited

U.S. PATENT DOCUMENTS

| | | | |
|---|---|---|---|
| 5,029,155 | 7/1991 | Kenjo | 369/116 |
| 5,226,027 | 7/1993 | Bakx | 369/116 |
| 5,305,297 | 4/1994 | Nishiuchi et al. | 369/116 |

FOREIGN PATENT DOCUMENTS

| | | |
|---|---|---|
| 0256827 | 2/1988 | European Pat. Off. . |
| 0393001 | 10/1990 | European Pat. Off. . |
| 62-66424 | 3/1987 | Japan . |
| 2-33737 | 2/1990 | Japan . |
| 3-100902 | 4/1991 | Japan . |

Primary Examiner—Paul M. Dzierzynski
Assistant Examiner—Don Wong
Attorney, Agent, or Firm—David G. Conlin; Robert F. O'Connell

[57] ABSTRACT

The first control data generating circuit continuously controls the output light-amount of a light source with respect to an optical disk that has not been formatted. In contrast, the second control data generating circuit controls the output light-amount of the light source at each of a plurality of sectors with respect to an optical disk that has been formatted. A discrimination circuit discriminates whether or not the optical disk has been formatted according to a detection of a header of each sector. According to a result of the discrimination of the circuit, a switch alley switches controlling operations between the first light-amount controlling operation and the second light-amount controlling operation. The difference between those two types of controlling operations merely lies in whether timing for controlling the light amount is dependent on each sector or not. Therefore, independent of whether or not the optical disk has been formatted, the light-amount control device of the present invention makes it possible to determine an optimum output light-amount by using a similar controlling operation.

19 Claims, 8 Drawing Sheets

LIGHT-AMOUNT CONTROL DEVICE FOR AN OPTICAL-DISK RECORDING-REPRODUCTION APPARATUS

FIELD OF THE INVENTION

The present invention relates to a light-amount control device for an optical disk recording-reproduction apparatus which uses a recording medium such as a magneto-optical disk.

BACKGROUND OF THE INVENTION

In a magneto-optical disk device, the magnetic film is locally heated by projecting a high-powered laser beam onto the magnetic film that is perpendicularly magnetized. By reversing the magnetization direction of the magnetic film to the direction of an external magnetic field through the heat, information is recorded or erased. However, generally speaking, the semiconductor laser tends to be affected by temperatures, and even if the driving current supplied to the semiconductor laser is kept constant, the I-P (driving current—amount of light emission) characteristic varies with temperature changes. For this reason, it is difficult to obtain a stable amount of light emission.

Moreover, when the disc-shaped recording medium is rotated in a constant angular velocity, the closer the position subjected to the irradiation of the laser beam comes to the circumference of the disk, the faster the relative linear velocity between the laser beam and the disc-shaped recording medium becomes. As a result, there arises a problem that irradiation energy applied to the magnetic film differs between the inner portions and the outer portions of the disc-shaped recording medium. Therefore, in the case where the driving current supplied to the semiconductor laser is kept constant regardless of radial positions of the disc-shaped recording medium, it is sometimes difficult to normally carry out recording or erasing of information.

In order to solve this problem, in conventional magneto-optical disk devices, the I-P characteristic is preliminarily tested with respect to the disc-shaped recording medium so that information is recorded and erased by the use of an optimum amount of light emission that is suitable for the associated radial position. In other words, a plurality of radial positions are preliminarily specified on the disc-shaped recording medium, and the tests are made while varying the intensity of the driving current to be supplied to the semiconductor laser so as to determine current values at which optimum amounts of light emission are respectively obtained for the radial positions. Thus, the normal controlling operation of the amount of light during recording and erasing is provided based on the resulting test data.

One of such conventional methods for controlling light amount is disclosed in, for example, Japanese Laid-Open Patent Application No. 33737/1990 (Tokukaihei 2-33737).

Moreover, in conventional methods, the controlling operation is performed for each sector based on timing provided for each sector that is pre-formatted on the magneto-optical disk. For example, Japanese Laid-Open Patent Application No. 66424/1987 (Tokukaishou 62-66424) discloses a method wherein the controlling operation is executed in the above-mentioned manner with respect to the header section whereon no data are recorded, namely, the header section having no fear of damaging data, based on timing provided for each sector that is obtained by reproducing the header section.

Furthermore, various controlling operations utilizing the timing for each sector are executed, for example, through a method disclosed in Japanese Laid-Open Patent Application No. 100902/1991 (Tokukaihei 3-100902).

Pre-formatting is a method for formatting a magneto-optical disk during its manufacturing process by forming a header section for each sector in the form of protrusion and recession. In contrast, besides this method, there is another method wherein a magneto-optical disk is formatted by recording header sections magneto-optically in a magneto-optical disk after the disk has been manufactured. (This method is hereinafter referred to as "soft formatting".)

When this soft formatting is adopted, two types of disks exist: (1) the unused disk before formatted wherein no header sections are provided; and (2) the disk wherein header sections have been provided by means of MO (magneto-optical) signals.

Here, as to light-amount controlling with respect to the disk (1), it is impossible to execute timing control for each sector; therefore, continuous light-amount controlling is required. In contrast, if continuous light-amount controlling is applied to the disk (2), the header sections, which have been formed on the disk, might be damaged. Therefore, as to light-amount controlling with respect to the disk (2), timing controlling for each sector is required.

As described above, in the conventional light-amount controlling methods and the light-amount control devices, it has been impossible to use the same method for controlling light-amount in making tests for recording, reproducing, and erasing with respect to the above-mentioned two types of disks.

SUMMARY OF THE INVENTION

It is an objective of the present invention to provide a light-amount control device for an optical disk recording-reproduction apparatus, wherein an optimum light amount is determined by using the same controlling method whether or not the recording medium, on and from which information is recorded and reproduced by means of light, has been formatted.

In order to achieve the above objective, the light-amount control device for an optical disk recording-reproduction apparatus of the present invention is characterized by having at least the following means.

(1) first light-amount control means for continuously controlling the output light-amount of a light source with respect to a recording medium that has not been formatted.

(2) second light-amount control means for controlling the output light-amount of a light source to be applied to each of a plurality of sectors with respect to a recording medium that has been formatted.

(3) discrimination means for discriminating whether or not a recording medium, loaded in the optical disk recording-reproduction apparatus, has been formatted.

(4) switching means for selectively switching the first light-amount control means and the second light-amount control means according to a result of discrimination made by the discrimination means.

With the above arrangement, the switching is made between the first light-amount control means and the second light-amount control means so as to control the output light-amount of the light source depending on whether the recording medium, loaded in the optical disk recording-reproduction apparatus, has been formatted or not. The difference between the operations of the first light-amount control means and the second light-amount control means lies in whether the timing for controlling the light amount is made dependent on sectors or not. More specifically, the difference lies in whether the light amount is controlled in synchronism with a detection signal of a sector or not.

Therefore, in the light-amount control device of the present invention, an optimum light amount is determined by using a similar controlling method whether or not the recording medium has been formatted.

For a fuller understanding of the nature and advantages of the invention, reference should be made to the ensuing detailed description taken in conjunction with the accompanying drawings.

DESCRIPTION OF THE EMBODIMENTS

Figure 1:
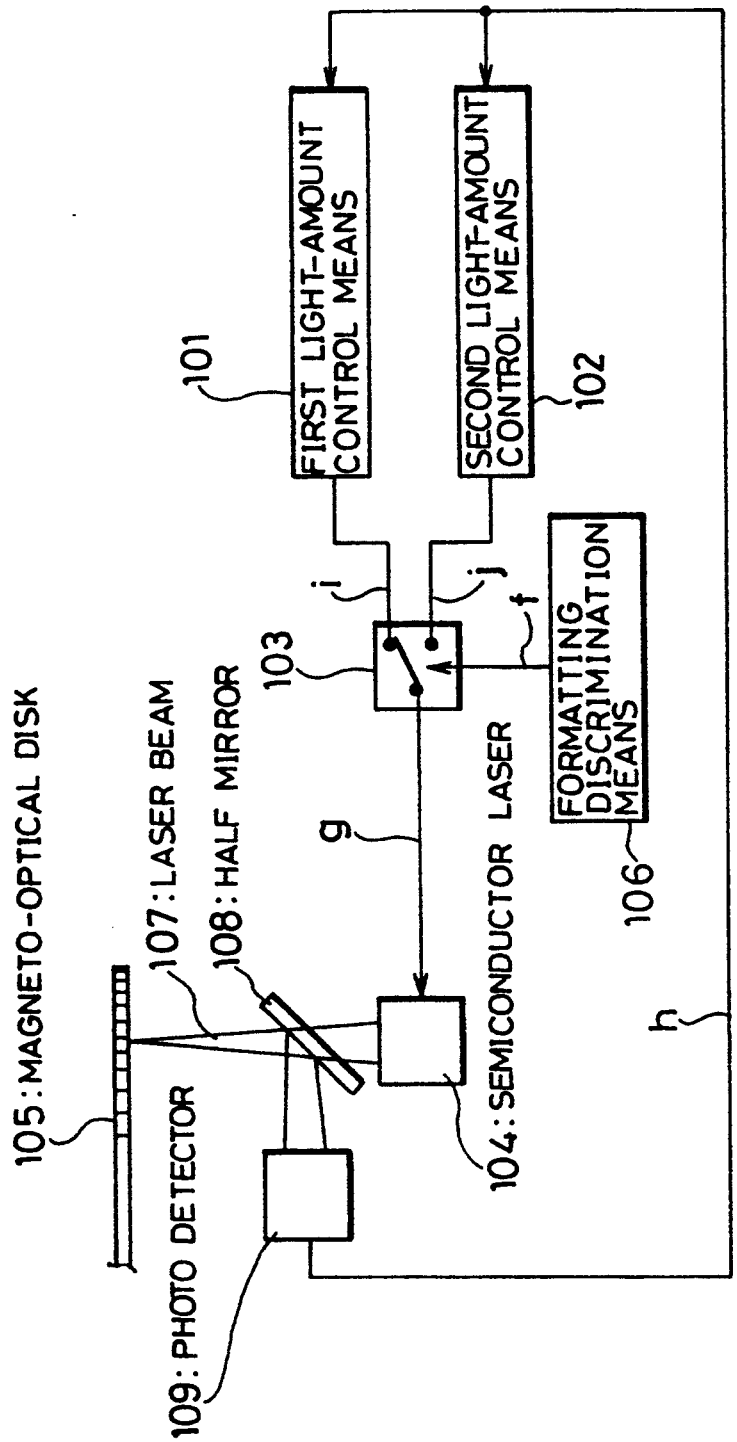
FIG. 1 is a block diagram showing one structural example of a light-amount control device for optical disk recording-reproduction apparatuses of the present invention.

FIG. 1 shows one structural example of a light-amount control device for optical disk recording-reproduction apparatuses of the present invention. The first light-amount control means 101 and the second light-amount control means 102 are connected to a semiconductor laser 104 through a switching circuit 103. A switching signal f, which has been released from a formatting discrimination means 106, is inputted to the switching circuit 103. A half mirror 108 is installed in the light path from the semiconductor laser 104 to a magneto-optical disk 105. A photodetector 109 is installed in the light path of reflected light that is directed from the magneto-optical disk 105 through the half mirror 108. A light-amount signal h, which is released from the photodetector 109, is fed back to the first and the second light-amount control means 101 and 102 respectively. The following description will discuss a light-amount testing operation and a normal light-amount controlling operation that is carried out during recording, reproducing and erasing respectively.

First, an explanation will be given of the light-amount testing operation. Either of two test current signals i and j, which are respectively released from the first light-amount control means 101 and the second light-amount control means 102, is selected in the switching circuit 103, and the selected test current signal g is directed to the semiconductor laser 104. The first light-amount control means 101 is used in the light-amount test of the semiconductor laser 104 in the case where the magneto-optical disk 105 has not been formatted, that is, in the case where no header section exists for each sector. The second light-amount control means 102 is, on the other hand, used in the case where the magneto-optical disk 105 has been formatted.

The formatting discrimination means 106 discriminates whether the magneto-optical disk 105 has been formatted or not, and releases the resulting switching signal f to the switching circuit 103. Thus, either of the two test current signals i and j is selected.

A laser light beam 107 projected from the semiconductor laser 104 is converged onto the magneto-optical disk 105 through the half mirror 108 so as to record and reproduce data thereon and therefrom. The reflected light from the magneto-optical disk 105 is directed to the photodetector 109 by the half mirror 108. Consequently, the photodetector 109 converts the light amount of the reflected light into an electric signal, thereby releasing the light-amount signal h. The light-amount signal h has an intensity that is proportional to the light amount of the laser light beam 107. By feeding back the light-amount signal h to the first and the second light-amount control means 101 and 102 respectively, the light amount of the semiconductor laser 104 can be tested with respect to the test current signal g. In this manner, a current value of the test current signal i or j is determined so as to provide an optimum light amount for the associated radial position on the magneto-optical disk 105.

In the normal light-amount controlling operation, the output light-amount of the semiconductor laser 104 is controlled by the first light-amount control means 101 or the second light-amount control means 102 based on the test data that were obtained through the above-mentioned light amount test.

Figure 2:
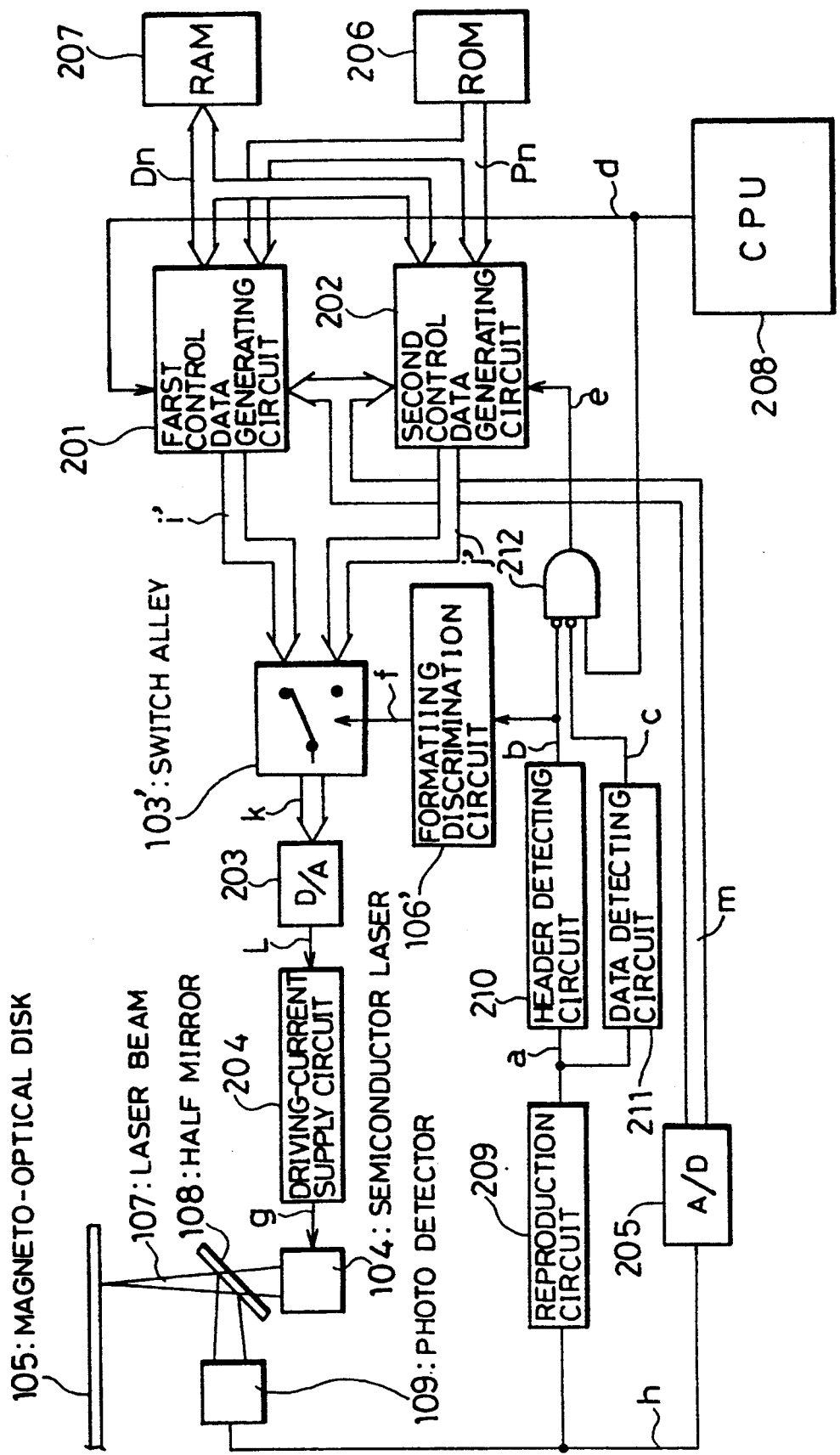
FIG. 2 is a block diagram showing a more specific structural example of the light-amount control device of FIG. 1.

FIG. 2 shows a more specific structural example of the light-amount control device of FIG. 1. Here, for convenience of explanation, those members that have the same functions and that are described in FIG. 1 are indicated by the same reference numerals and the description thereof is omitted.

The first control data generating circuit 201 and the second control data generating circuit 202 respectively generate test current data i' and j', each having eight bits. A switch alley 103', after receiving the test current data i' and j', selects either of the data, and releases it to a D/A converter 203 as a test current datum k.

The test current datum k is converted into an analog test current signal L in the D/A converter 203. A driving-current supply circuit 204 receives the test current signal L from the D/A converter 203, and releases to the semiconductor laser 104 a driving current g that is proportional to the test current signal L. The semiconductor laser 104 projects a laser light beam 107 having a light amount corresponding to the driving current g to the magneto-optical disk 105.

The photodetector 109 detects the reflected light from the magneto-optical disk 105, and releases a light-amount signal h. The light-amount signal h is converted into a light-amount datum m in the A/D converter 205, and is fed back to the first and the second control data generating circuits 201 and 202 respectively. Thus, the light amount of the laser light beam 107 can be tested, thereby making it possible to determine a current datum Dn that corresponds to an optimum light-amount.

Further, a ROM 206 is provided to store target light-amount data Pn that are required for testing the light amount of the laser light beam 107, and the first and the second control data generating circuits 201 and 202 are capable of taking the target light-amount data Pn from the ROM 206, if necessary. Moreover, a RAM 207 is installed so as to store the current data Dn that have been determined in the first and the second control data generating circuits 201 and 202.

Figure 6:
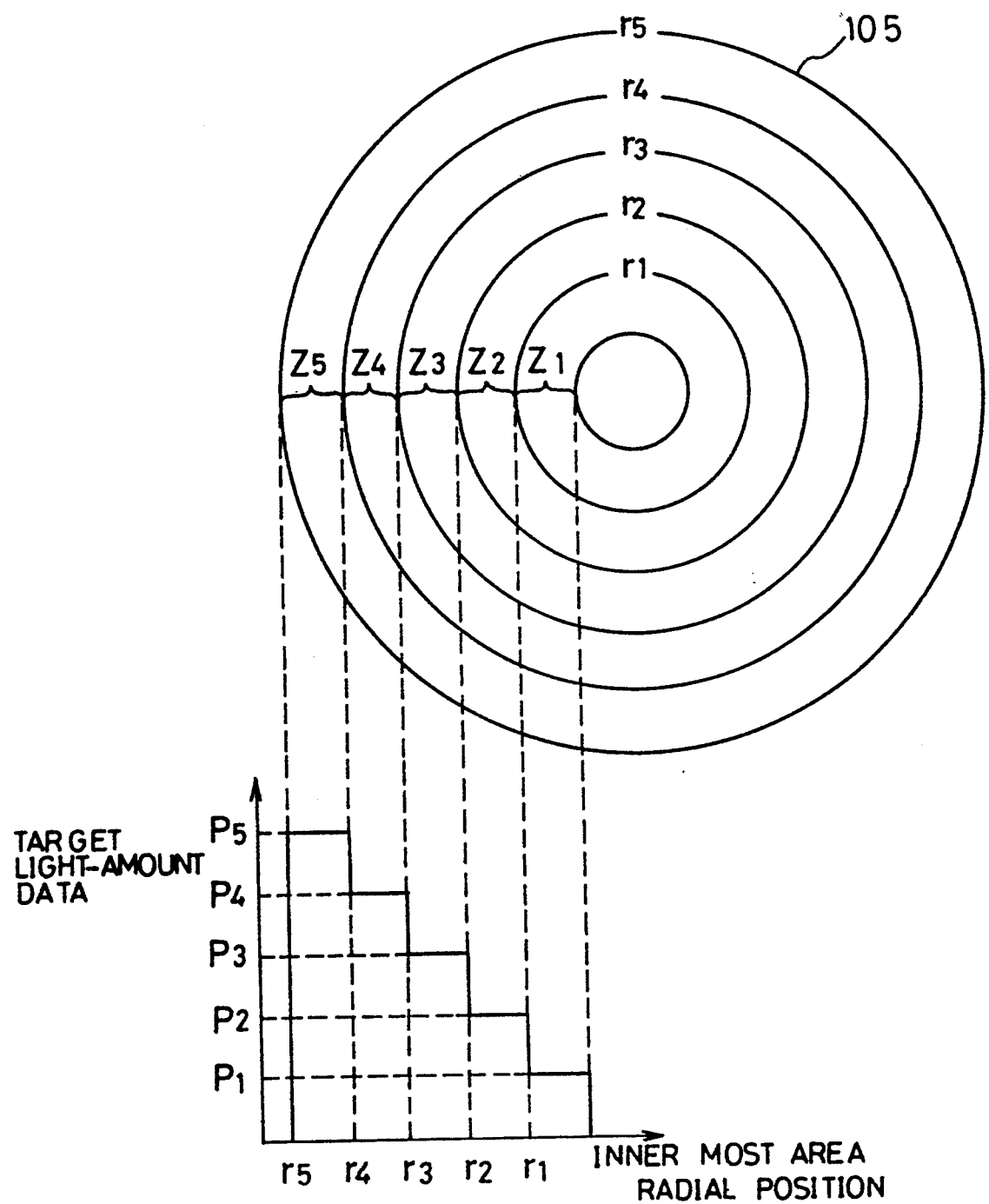
FIG. 6 is an explanatory drawing which shows an optimum target light-amount for each of regions that are respectively classified depending on radial positions on a recording medium.

As illustrated in FIG. 6, in order to make constant the irradiation energy of the laser light beam 107 to be applied to the magnetic film of the magneto-optical disk independent of associated radial positions, it is necessary to increase the target light-amount datum Pn in proportion to the associated radial positions. The reason is that since the magneto-optical disk 105 is driven by a driver, not shown, at a constant angular velocity, the relative linear velocity between the laser light beam 107 and the magneto-optical disk 105 increases as the associated radial position comes closer to the peripheral. For this reason, the magneto-optical disk 105 is classified into, for example, a plurality of regions $Z_1$ to $Z_5$ depending on the radial positions r1 to r5, and target light-amount data P1 to P5 are preliminarily determined for the respective regions. Here, the order of the values of the target light-amount data P1 to P5 is indicated by: $P1 < P2 < P3 < P4 < P5$.

On the other hand, the light-amount signal h released from the photodetector 109 is inputted to a reproduction circuit 209. The reproduction circuit 209 releases a reproduced signal a to a header detecting circuit 210 and a data detecting circuit 211. The header detecting circuit 210 releases a header detection signal b to a formatting discrimination circuit 106' and the first input terminal of a logical circuit 212. Moreover, the data detecting circuit 211 releases a data detection signal c to the second input terminal of the logical circuit 212. The formatting discrimination circuit 106' generates a switching signal f which maintains High until the magneto-optical disk 105 is replaced once a header has been detected from the magneto-optical disk 105. If no header has been detected, the switching signal f remains Low. The switch alley 103' selects the test current datum i' as the first test datum when the switching signal f is Low, and selects the test current datum j' as the second test datum when the switching signal f is High.

Therefore, the first control data generating circuit 201 corresponds to the first light-amount control means 101 of FIG. 1, and the header detecting circuit 210, the data detecting circuit 211, the logical circuit 212 and the second control data generating circuit 202 correspond to the second light-amount control means 102 of FIG. 1.

Further, a CPU 208 is installed to release a test command signal d to the third input terminal of the logical circuit 212 and the first control data generating circuit 201 in such a manner that the light-amount testing operation and the normal light-amount controlling operation are switched therebetween by the test command signal d. The output of the logical circuit 212 is connected to the second control data generating circuit 202. The logical circuit 212 releases a test section signal e having High to the second control data generating circuit 202 only if both of its first and second input terminals are Low with its third input terminal being High, thereby activating the second control data generating circuit 202. In contrast, when the test section signal e is Low, the operation of the second control data generating circuit 202 is stopped.

In the above arrangement, the light-amount testing operation on the magneto-optical disk 105 that has not been formatted is in turn explained with reference to FIGS. 3(a) through 3(e).

Figure 3:
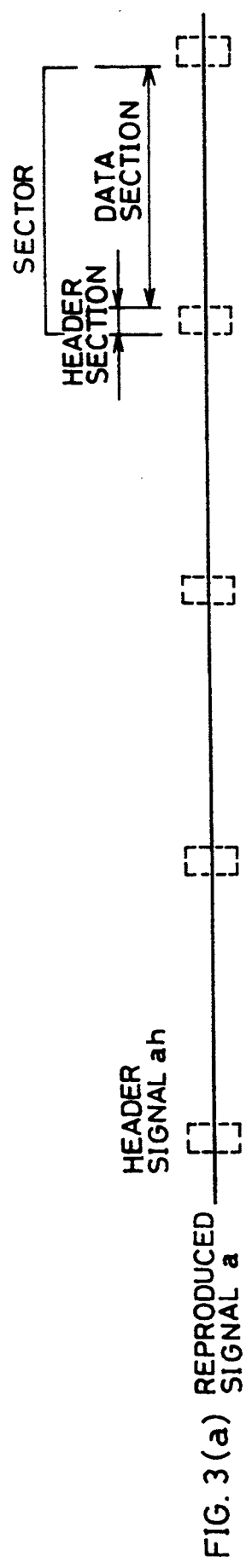
FIGS. 3(a), 3(b), 3(c), 3(d) and 3(e) show timing charts with respect to a light-amount testing operation which was conducted on a recording medium that had not been formatted.

A broken line in FIG. 3(a) hypothetically shows a header signal ah that is reproduced in the case where the magneto-optical disk 105 has been formatted. However, in an actual operation, if the magneto-optical disk 105 has not been formatted, a resulting reproduced signal a does not contain any signals from a header section and a data section, as is illustrated by a solid line in FIG. 3(a). Therefore, as illustrated in FIGS. 3(b) and 3(c), the header detection signal b as well as the data detection signal c goes Low, and the switching signal f, which is generated according to the header detection signal b, also goes Low as illustrated in FIG. 3(e). As a result, the test current datum i' is selected. As illustrated in FIG. 3(d), the CPU 208 releases a test command signal d having High if the header detection signal b is kept Low for a predetermined period of time. Thus, a light-amount testing operation is executed by the use of the first control data generating circuit 201. Here, the predetermined period of time may be desirably set.

Figure 7:
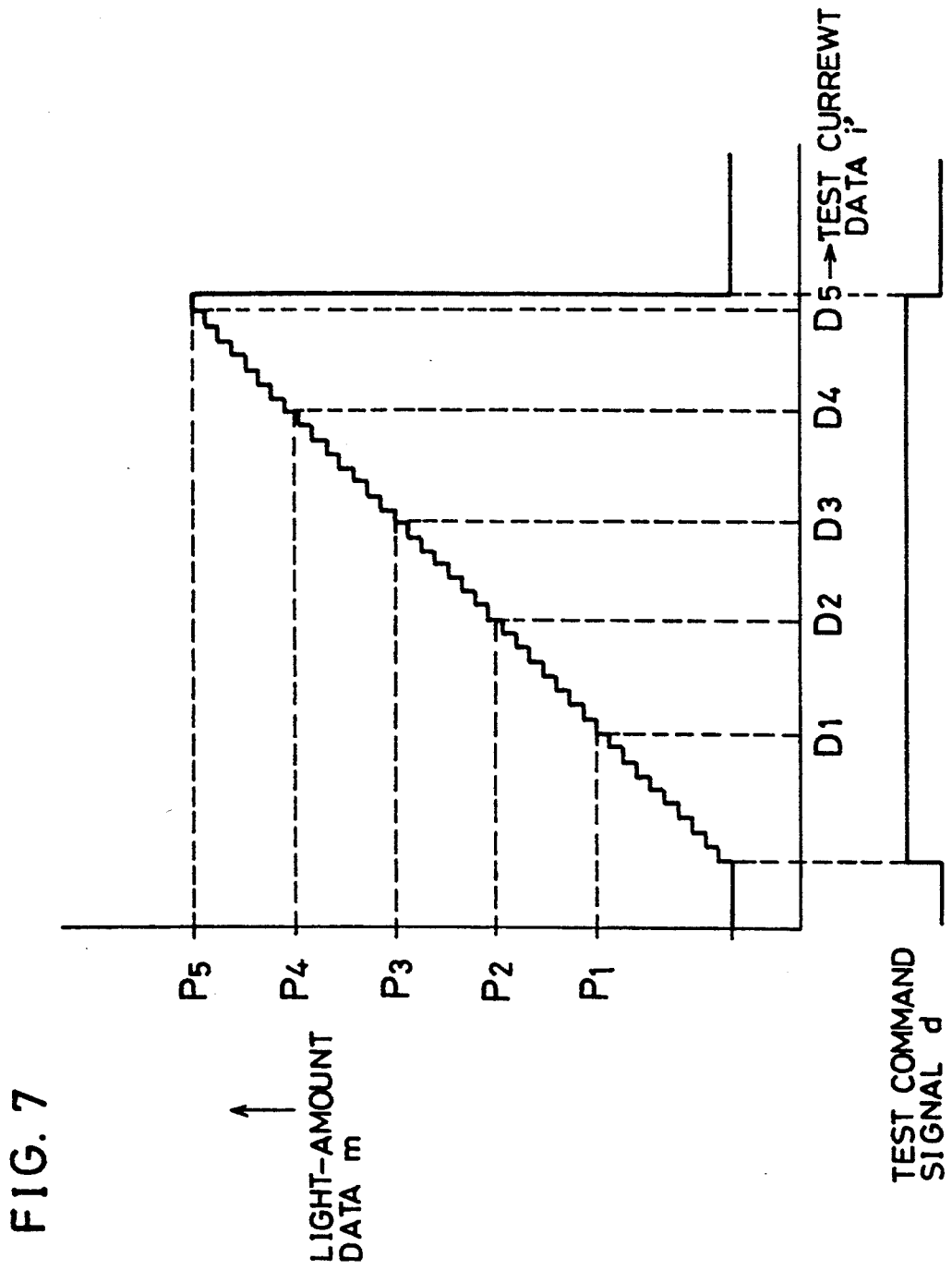
FIG. 7 is a graph showing a relationship between tested current data and light-amount data in the light-amount test which was conducted on the recording medium that had not been formatted.

As illustrated in FIG. 7, the test current datum i' is increased during a period when the test command signal is kept High. In proportion to this, the light-amount datum m also increases; however, by simultaneously comparing the light-amount datum m with the target light-amount data P1 to P5 that are preliminarily stored in the ROM 206, the current datum Dn can be determined. For example, a test current datum i' which was obtained when the light amount datum m coincided with the target light-amount datum P1 is stored in the RAM 207 as a current datum D1. As shown in FIG. 6, this current datum D1 enables the semiconductor laser 104 to emit a laser light beam 107 having a light amount that is required for irradiating, for example, a region from the innermost position to the radial position r1 on the magneto-optical disk 105. In the same manner as the above, current data D2 to D5 are stored in the RAM 207 with respect to the other target light-amount data P2 to P5. Thus, all the current data Dn are determined.

Next, the light-amount testing operation on the magneto-optical disk 105 that has been formatted is in turn explained with reference to FIGS. 4(a) through 4(f).

Figure 4:
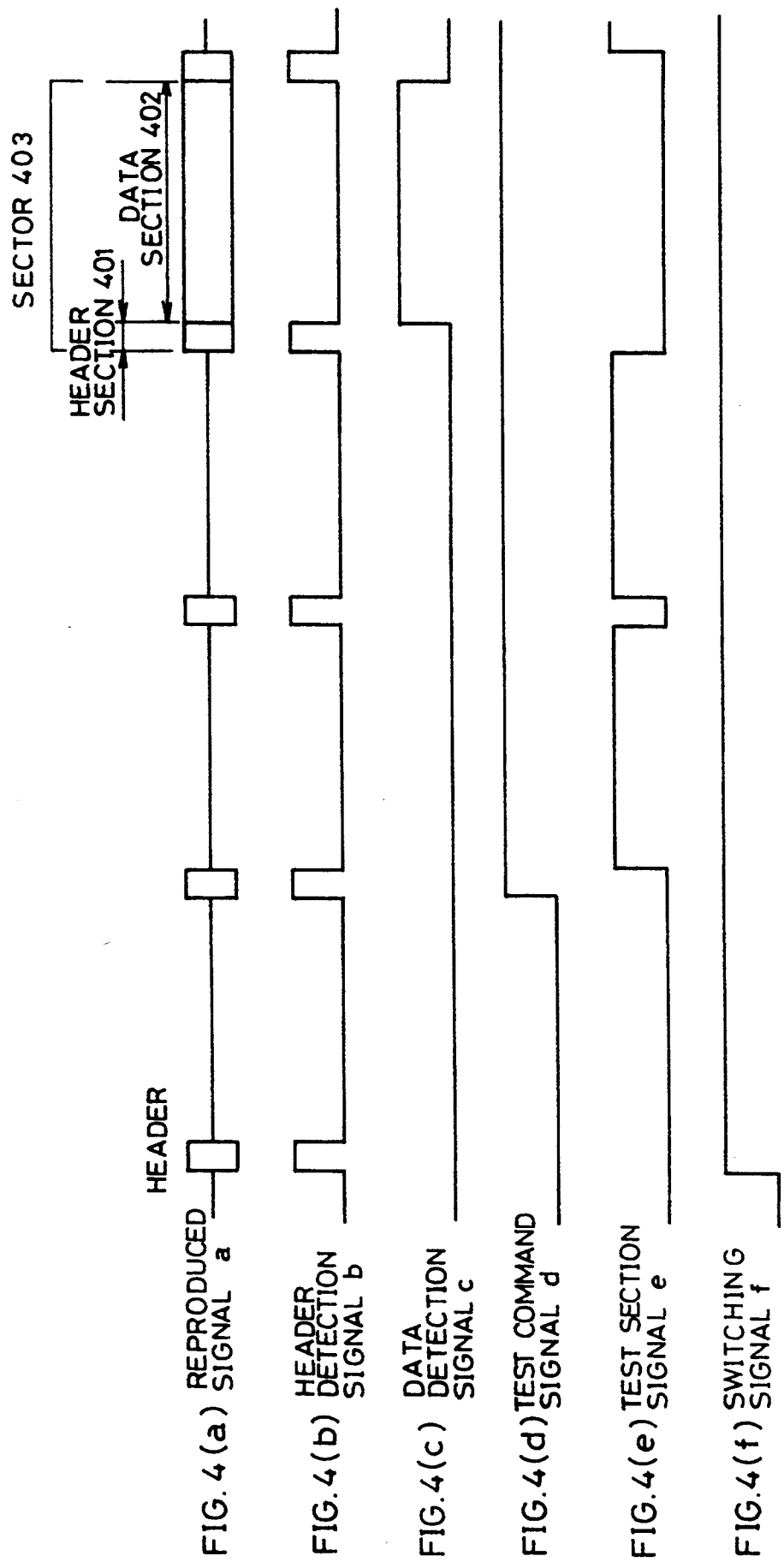
FIGS. 4(a), 4(b), 4(c), 4(d), 4(e) and 4(f) show timing charts with respect to a light-amount testing operation which was conducted on a recording medium that had been formatted.

As shown in FIG. 4(a), the reproduced signal a contains signals derived from a header section 401 and a data section 402 that constitute a sector 403. Therefore, as shown in FIGS. 4(b) and 4(c), the header detection signal b goes High in response to the header section 401 and the data detection signal c also goes High in response to the data section 402. As shown in FIG. 4(f), the switching signal f is kept High once the header detection signal b has gone High. In this case, the test current datum j' is selected.

When the test command signal d shown in FIG. 4(d) goes High, the logical circuit 212 releases a test section signal e having High only if both of the header detection signal b and the data detection signal c are Low. Therefore, the second control data generating circuit 202 is allowed to execute a light-amount testing operation on a portion of the magneto-optical disk 105 where neither headers nor data are recorded. In other words, through the execution of these light-amount testing operations, it is avoidable to destroy headers and data that have been recorded.

Figure 8:
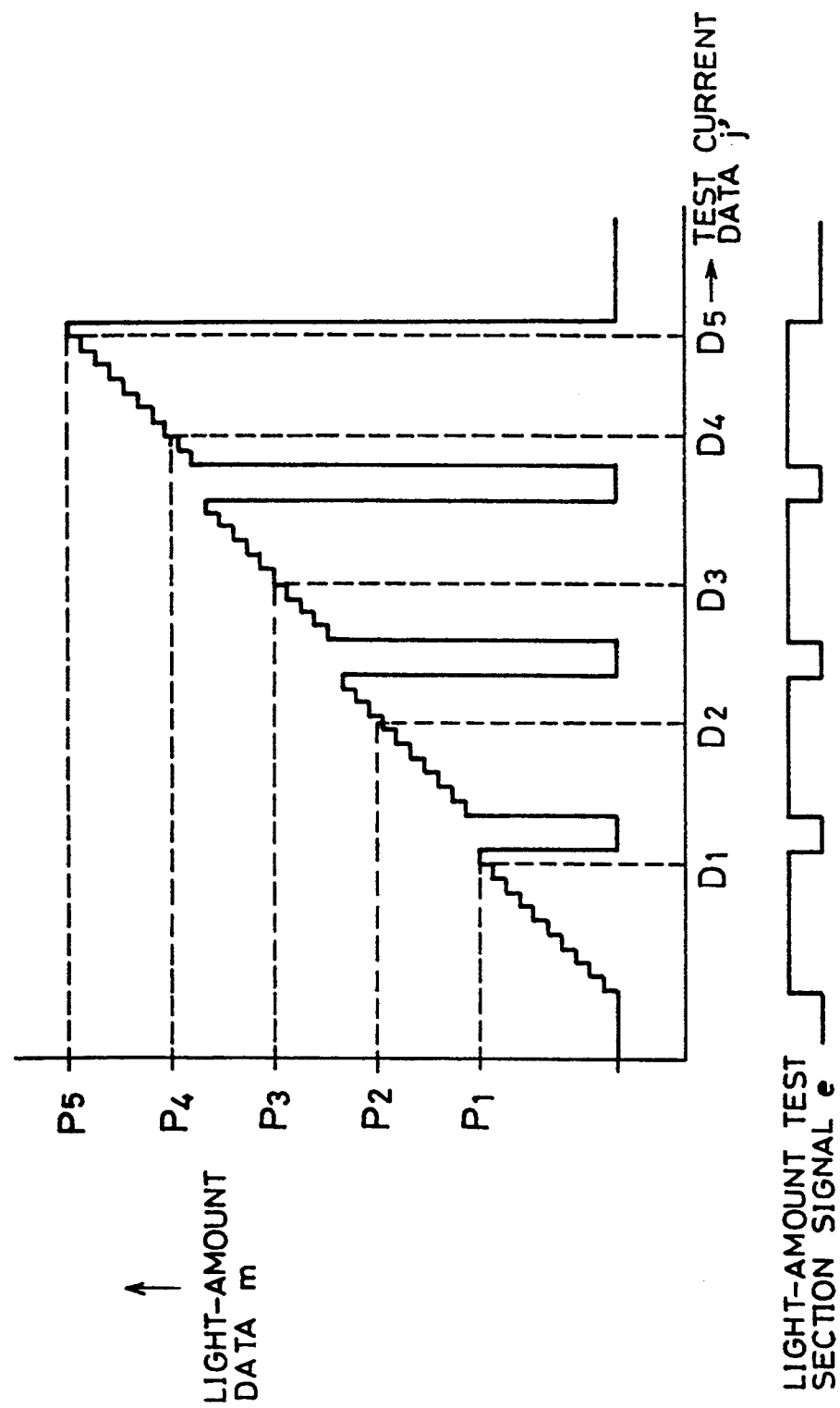
FIG. 8 is a graph showing a relationship between tested current data and light-amount data in the light-amount test which was conducted on the recording medium that had been formatted.

As illustrated in FIG. 8, the test current datum j' is increased only during a period when the test section signal e is kept High. In this case, the light-amount datum m also increases in proportion to the test current datum j'; however, by comparing the light-amount datum m with each of the target light-amount data P1 to P5 that are preliminarily stored in the ROM 206, the current data D1 to D5 are determined, and stored in the RAM 207. This procedure is the same as that described in the case of the test current data i' except that the operation of the second control data generating circuit 202 is stopped when the test section signal e is Low.

Lastly, an explanation will be given on the successive processes of the light-amount testing operation with reference to FIG. 5. First, the CPU 208 releases a test command, thereby starting a testing operation (Step 1, hereinafter, referred to as S1). Next, detection of headers is executed (S2), and discrimination is made as to whether or not the magneto-optical disk 105 has been formatted (S3). If the magneto-optical disk 105 has been formatted, the second testing means (the second control data generating circuit 202) is selected by the use of the switching signal f and the test command signal d (S4). Thus, the second testing data (test current datum j') are selected, and the test current datum j' is increased in the areas except the header section 401 and the data section 402 (S6).

In contrast, if the magneto-optical disk 105 has not been formatted, judgement is made as to whether or not a predetermined period of time has elapsed (S7). If no headers have been detected after the expiration of the predetermined period of time, the first testing means (the first control data generating circuit 201) is selected by the use of the test command signal d (S8). If a header has been detected, the sequence returns to S2, thereby resuming the detection of headers. When the first testing means is selected, the first testing data (test current datum i') are selected, and the test current datum i' is continuously increased (S10).

While increasing the test current datum i' or j' in the first testing means or in the second testing means as described above (S6 or S10), 1 is first put in the place of n (S11), and comparison is made between the light-amount datum m, which gradually increases in proportion to the test current datum i' or j', and the target light-amount datum Pn which is preliminarily stored in the ROM 206 (S12). If the light-amount datum m coincides with the target light-amount datum Pn, the current datum Dn is substituted by the test current datum i' or j' in question (S13). If this is not the case, the sequence returns to S12, thereby repeating the comparison between the light-amount datum m and the target light-amount datum Pn.

When a current datum Dn is determined, judgement is made as to whether or not all the current data Dn have been determined, that is, whether or not n=5 (the largest natural number) has been satisfied (S14), and if so, all the current data Dn are stored in the RAM 207 (S15); whereas if not so, n is added by 1 (S16), and the sequence returns to S12. When all the current data Dn have been stored in the RAM 207, the testing operation is completed (S17). Thereafter, the normal controlling operation is carried out according to the above-mentioned current data Dn until the magneto-optical disk 105 is replaced.

In other words, in the normal light-amount controlling operation, the light-amount is controlled by generating the controlling data from the first and second control data generating circuit 201 and 202 according to the current data Dn that have been stored in the RAM 207 through the above-mentioned light-amount testing operation.

As described above, the present invention makes it possible to promptly judge whether the magneto-optical disk 105 has been formatted or not, and according to the result of the judgement, an optimum light-amount testing operation is selected. That is, in the case where the magneto-optical disk 105 has not been formatted, an optimum current datum Dn is determined based on the target light-amount data Pn while increasing the test current datum i' by the use of the first control data generating circuit 201. In contrast, in the case where the magneto-optical disk 105 has been formatted, an optimum current datum Dn is determined while continuously increasing the test current datum j' by the use of the second control data generating circuit 202 with respect to the areas other than the header section and the data section. Therefore, independent of whether or not the magneto-optical disk 105 has been formatted, the optimum current data Dn are determined in a similar controlling operation, and by the use of the resulting current data Dn, recording, reproduction and erasing can be made using the respective optimum light amounts.

Figure 5:
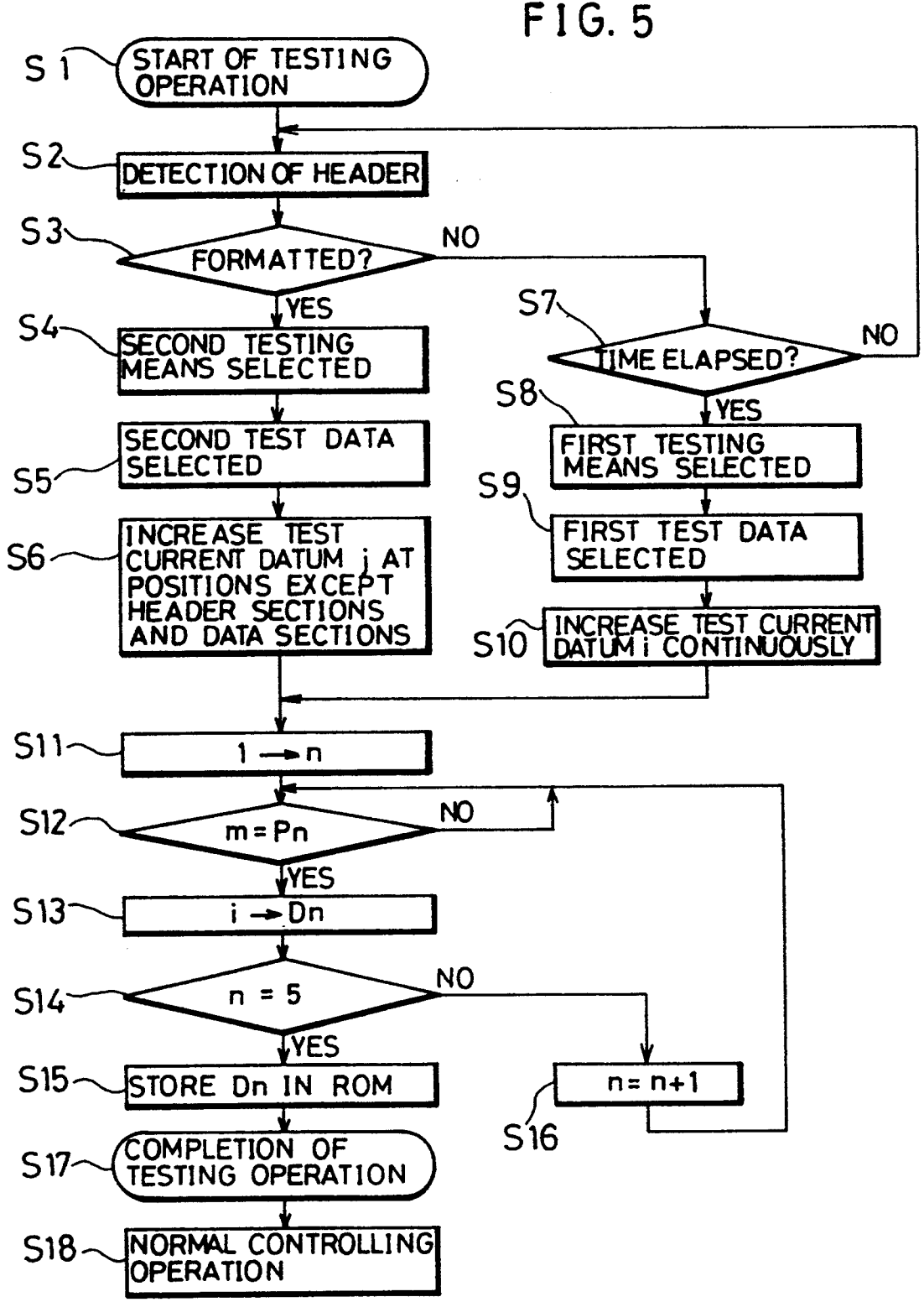
FIG. 5 is a flow chart showing the light-amount testing operation of the light-amount control device.

Additionally, the first control data generating circuit 201, the second control data generating circuit 202, the formatting discrimination circuit 106', and switch alley 103' of FIG. 2 may be replaced with a CPU, and the CPU may execute the routine shown in FIG. 5.

Moreover, the formatting discrimination circuit 106' may be installed in the magneto-optical disk apparatus as a switch, and the operator may enter the fact whether or not the magneto-optical disk 105 has been formatted through the on and off positions of the switch.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A light-amount control device for an optical disk recording-reproduction apparatus comprising:

first light-amount control means for continuously controlling the output light-amount of a light source with respect to a recording medium that has not been formatted;

second light-amount control means for controlling the output light-amount of the light source to be applied to each of a plurality of sectors with respect to a recording medium that has been formatted;

discrimination means for discriminating whether or not a recording medium, loaded in the optical disk recording-reproduction apparatus, has been formatted; and switching means for selectively switching the first light-amount control means and the second light-amount control means according to a result of discrimination made by the discrimination means.

2. The light-amount control device as defined in claim 1, further comprising:
light-amount-test command means for releasing a test command signal to the first light-amount control means and the second light-amount control means so as to make them execute a light-amount testing operation for determining an optimum output light-amount to be applied to the recording medium.

3. The light-amount control device as defined in claim 1, wherein the discrimination means comprises:
header detection means for generating a header detection signal by detecting a header of the sector.

4. The light-amount control device as defined in claim 3, wherein the discrimination means comprises:
selection control means for releasing to the switching means a first selection signal that is used for selecting the first light-amount control means if the header detection means has not generated a header detection signal within a predetermined period of time as well as for releasing to the switching means a second selection signal that is used for selecting the second light-amount control means if the header detection means has generated the header detection signal within the predetermined period of time.

5. The light-amount control device as defined in claim 4, wherein the discrimination means further comprising:
information detection means for generating an information detection signal by detecting recorded information contained in the sector.

6. The light-amount control device as defined in claim 5, wherein the discrimination means further comprising:
light-amount-control stopping means for releasing a stopping signal for stopping the operation of the second light-amount control means when the information detection means generates the information detection signal.

7. The light-amount control device as defined in claim 6, wherein the light-amount-control stopping means is a logical circuit for generating a logical product of inverted outputs of the header detection means and the information detection means and an output of the selection control means.

8. The light-amount control device as defined in claim 1, further comprising light-source driving means for supplying to the light source a driving current to be used for changing the output light-amount,
wherein the first light-amount control means includes a first controlling output means for releasing to the light-source driving means a first controlling signal for controlling the driving current and the second light-amount control means includes a second controlling output means for releasing to the light-source driving means a second controlling signal for controlling the driving current.

9. The light-amount control device as defined in claim 8, further comprising:
light amount detection means for generating a light-amount signal by detecting the output light-amount and for feeding back the light-amount signal to the first light-amount control means; and
storage means for storing target values of the output light-amount,
wherein the first light-amount control means includes comparison control means for comparing the output light-amount with the target value and for determining the value of the first control signal so as to make the output light-amount coincide with the target value.

10. The light-amount control device as defined in claim 9, wherein the light-amount detection means includes a photodetector for detecting a light amount of a reflected light from the recording medium.

11. The light-amount control device as defined in claim 9, further comprising:
rotation driving means for rotatively driving the recording medium at a constant angular velocity,
wherein the storage means stores a plurality of target values that are given in an increasing manner along radial positions of the recording medium.

12. The light-amount control device as defined in claim 8, further comprising:
light amount detection means for generating a light-amount signal by detecting the output light-amount and for feeding back the light-amount signal to the second light-amount control means; and
storage means for storing target values of the output light-amount,
wherein the second light-amount control means includes comparison control means for comparing the output light-amount with the target value and for determining the value of the second control signal so as to make the output light-amount coincide with the target value.

13. The light-amount control device as defined in claim 12, wherein the light-amount detection means includes a photodetector for detecting a light amount of a reflected light from the recording medium.

14. The light-amount control device as defined in claim 12, further comprising:
rotation driving means for rotatively driving the recording medium at a constant angular velocity,
wherein the storage means stores a plurality of target values that are given in an increasing manner with radial positions of the recording medium.

15. The light-amount control device as defined in claim 1, wherein the discrimination means further comprising:
information detection means for generating an information detection signal by detecting recorded information contained in the sector.

16. The light-amount control device as defined in claim 15, wherein the discrimination means further comprising:
light-amount-control stopping means for releasing a stopping signal for stopping the operation of the second light-amount control means when the information detection means generates the information detection signal.

17. A method used in a light-amount control device for determining an optimum light-amount to be applied to a recording medium loaded in an optical disk recording-reproduction apparatus comprising the steps of:
discriminating whether or not a header of a sector has been detected within a predetermined period of time; and
switching operations according to the result of the discrimination between a first light-amount testing operation for determining an optimum light-amount with respect to a recording medium that has not been formatted and a second light-amount testing operation for determining an optimum light-amount with respect to a recording medium that has been formatted.

18. The method as defined in claim 17, further comprising the steps of:

discriminating whether or not information is recorded in a data section of a sector at a certain radial position with respect to the recording medium that has been formatted;

projecting a light beam onto a portion except the header and the recorded data section within the sector situated in the radial position and detecting a light amount of the light beam;

comparing the detected value of the light amount with a target value of an optimum light amount at the radial position; and controlling the light amount so as to make the detected value coincide with the target value.

19. The method as defined in claim 17, further comprising the steps of:

projecting a light beam onto a certain radial position on a recording medium that has not been formatted and detecting a light amount of the light beam;

increasing the light amount continuously as the relevant radial position comes closer to the peripheral of the recording medium;

comparing the detected value of the light amount successively with each target value of optimum light amounts at corresponding radial positions; and controlling the light amount so as to make the detected value coincide with the target value.

* * * * *